(12) United States Patent
Peng

(10) Patent No.: US 11,144,205 B2
(45) Date of Patent: Oct. 12, 2021

(54) AUDIO PLAYBACK DEVICE AND OPERATION METHOD OF THE SAME

(71) Applicant: Realtek Semiconductor Corporation, Hsinchu (TW)

(72) Inventor: Chun-Hao Peng, Toufen (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 151 days.

(21) Appl. No.: 16/585,142

(22) Filed: Sep. 27, 2019

(65) Prior Publication Data

US 2020/0104053 A1 Apr. 2, 2020

(30) Foreign Application Priority Data

Sep. 27, 2018 (TW) ................. 107134169

(51) Int. Cl.
*G06F 3/06* (2006.01)
*G05B 19/42* (2006.01)
*G06F 13/20* (2006.01)
*G06F 3/16* (2006.01)

(52) U.S. Cl.
CPC .......... *G06F 3/0607* (2013.01); *G05B 19/42* (2013.01); *G06F 13/20* (2013.01); *G06F 3/16* (2013.01)

(58) Field of Classification Search
CPC .................... G10L 21/00; H04N 9/80
See application file for complete search history.

(56) References Cited

U.S. PATENT DOCUMENTS

| | | | |
|---|---|---|---|
| 2009/0157575 A1* | 6/2009 | Schobben | H04S 3/02 706/14 |
| 2010/0161857 A1* | 6/2010 | Ding | G06F 3/16 710/69 |
| 2011/0305435 A1* | 12/2011 | Tanaka | G06F 21/52 386/259 |
| 2014/0330951 A1* | 11/2014 | Sukoff | H04L 12/2818 709/223 |

FOREIGN PATENT DOCUMENTS

TW 201351158 A 12/2013

\* cited by examiner

*Primary Examiner* — Getente A Yimer
(74) *Attorney, Agent, or Firm* — Locke Lord LLP; Tim Tingkang Xia, Esq.

(57) ABSTRACT

An audio playback device operation method is provided. First audio playback device information corresponding to a first transmission bus format is selected to respond to a host according to a status descriptor request thereof. Whether an audio class-specific request command is received from the host is determined. When the audio class-specific request command is received, the response to the status descriptor request from the host is maintained. When the audio control feature unit descriptor request command is not received, the host is determined to not support the first transmission bus format. Second audio playback device information corresponding to a second audio bus transmission format is selected to response to the host according to the status descriptor request of the host such that when the audio class-specific request command is received, the response to the status descriptor request from the host is maintained.

18 Claims, 3 Drawing Sheets

AUDIO PLAYBACK DEVICE AND OPERATION METHOD OF THE SAME

RELATED APPLICATIONS

This application claims priority to Taiwan Application Serial Number 107134169, filed Sep. 27, 2018, which is herein incorporated by reference.

BACKGROUND

Field of Invention

The present invention relates to an audio playback technology. More particularly, the present invention relates to an audio playback device and an operation method of the same.

Description of Related Art

The audio earphone port adapted by most electronic products such as smartphones, computers and tablet PCs is gradually transformed from the analog form to the digital form. The development of USB Type-C further increases the popularity of digital audio playback device. However, the operation system of some hosts may not support the latest transmission port format such that the digital audio playback device can not operation with the host.

Accordingly, what is needed is an audio playback device and an operation method of the same to address the issues mentioned above.

SUMMARY

An aspect of the present invention is to provide an audio playback device operation method used in an audio playback device that includes the steps outlined below. The audio playback device is electrically connected to a host through a bus. First audio playback device information corresponding to a first transmission bus format is selected to respond to the host in response to a status descriptor request from the host. Whether an audio class-specific request command is received from the host is determined. When the audio class-specific request command is received, the response to the status descriptor request from the host is maintained. When the audio class-specific request command is not received, the host does not support the first transmission bus format is determined. The audio playback device is electrically connected the host through the bus again and second audio playback device information corresponding to a second audio bus transmission format is selected to respond to the host according to the status descriptor request of the host such that when the audio class-specific request command is received, the response to the status descriptor request from the host is maintained.

Another aspect of the present invention is to provide an audio playback device that includes a storage unit and a processing unit. The storage unit is configured to store a plurality of pieces of audio playback device information corresponding to a plurality of transmission bus formats and an application program. The processing unit is electrically connected to the storage unit and is configured to retrieve the application program to execute an audio playback device operation method. The audio playback device operation method includes the steps outlined below. The audio playback device is electrically connected to a host through a bus. First audio playback device information corresponding to a first transmission bus format is selected to respond to the host in response to a status descriptor request from the host. Whether an audio class-specific request command is received from the host is determined. When the audio class-specific request command is received, the status descriptor request from the host is kept responding. When the audio class-specific request command is not received, the host does not support the first transmission bus format is determined. The audio playback device is electrically connected to the host through the bus again and second audio playback device information corresponding to a second audio bus transmission format is selected to respond to the host according to the status descriptor request of the host such that when the audio class-specific request command is received, the response to the status descriptor request from the host is maintained.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
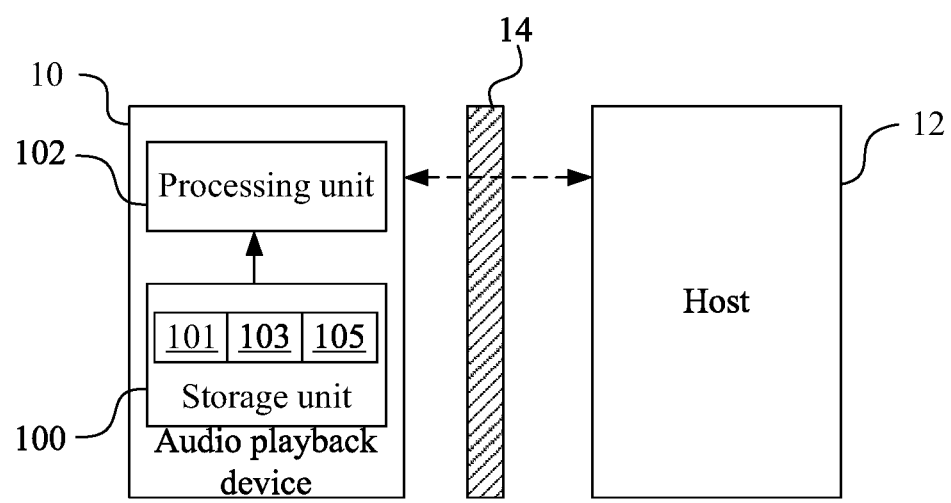
FIG. 1 is a block diagram of an audio playback device and a host in an embodiment of the present invention.

Reference is now made to FIG. 1. FIG. 1 is a block diagram of an audio playback device 10 and a host 12 in an embodiment of the present invention.

In an embodiment, the audio playback device 10 can be such as, but not limited to a device. e.g. an earphone, a headset or an amplifier, that can receive and playback audio information (not illustrated) from the host 12. The host 12 can be such as, but not limited to a laptop, a notebook or a handheld electronic device such as a smartphone or a tablet PC that can provide audio data.

In an embodiment, the audio playback device 10 is electrically connected to the host 12 through the bus 14. More specifically, the bus 14 can be any interface that can make the audio playback device 10 and the host physically electronically connected together to perform transmission of data and commands. In an embodiment, the bus 14 is universal serial bus.

The audio playback device 10 includes a storage unit 100 and a processing unit 102.

The storage unit 100 is configured to store first audio playback device information 101, second audio playback device information 103 and an application program 105. In an embodiment, the storage unit 100 can be a flash memory, an electrically-erasable programmable read-only memory (EEPROM) or an electrically-erasable programmable read-only memory (EEPROM). In other embodiments, the storage unit 100 can be implemented by other types of memories or can be a compound storage unit that includes different types of memories.

The first audio playback device information corresponds to a first transmission bus format. The second audio playback device information corresponds to a second transmission bus format different from the first transmission bus formats. In an embodiment, when the bus 14 is the universal serial bus, the first transmission bus format can be such as, but not limited to universal serial bus device class definition for audio devices v2.0, and the second transmission bus format can be such as, but not limited to universal serial bus device class definition for audio devices v1.0.

It is appreciated that the types of the bus 14 and the types of the first audio playback device information 101 and the second audio playback device information 103 described are merely an example. In other embodiment, the bus 14 can be other types of buses. The audio playback device information 101 and the second audio playback device information 103 can be the types of the audio playback device information respectively matching the type of the bus 14.

The processing unit 102 is electrically connected to the storage unit 100 and is configured to access the storage unit 100. In an embodiment, the application program 105 stored in the storage unit 100 can be such as, but not limited to a firmware retrieved by the processing unit 102 such that the related operations can be executed.

Figure 2:
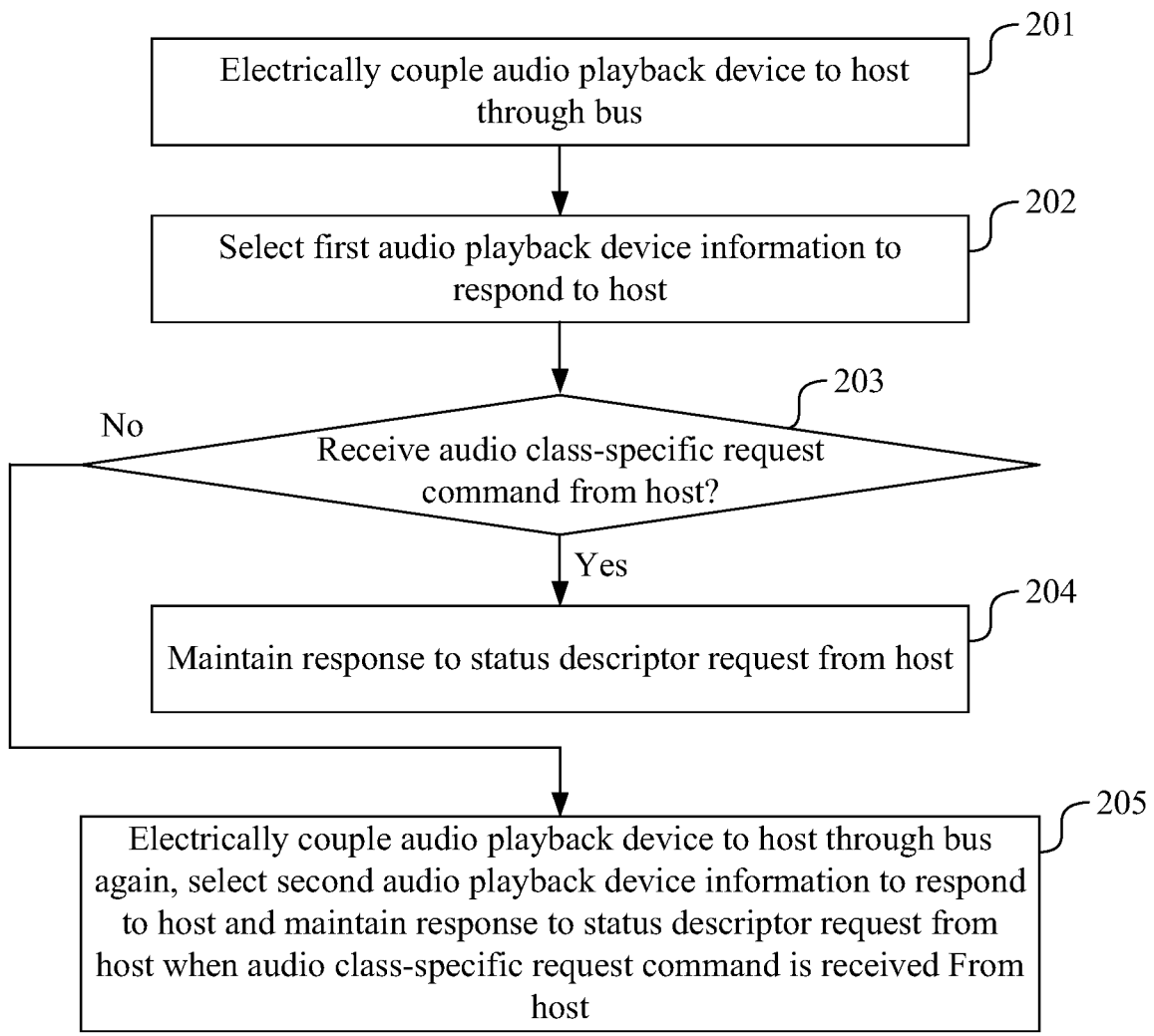
FIG. 2 is a flow chart of an audio playback device operation method in an embodiment of the present invention.

Reference is now made to FIG. 2. FIG. 2 is a flow chart of an audio playback device operation method 200 in an embodiment of the present invention. The audio playback device operation method 200 can be used in the audio playback device 10 illustrated in FIG. 1. More specifically, in an embodiment, the processing unit 102 of the audio playback device 10 is able to retrieve and execute the application program 105 in the storage unit 100 to operate the audio playback device operation method 200.

The audio playback device operation method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, the audio playback device 10 is electrically connected to the host 12 through the bus 14.

In step 202, the audio playback device 10 selects the first audio playback device information 101 to respond to the host 12 in response to a status descriptor request from the host 12. In an embodiment, the first audio playback device information 101 includes such as, but not limited to device descriptor information and generalized configuration descriptor information.

Figure 3:
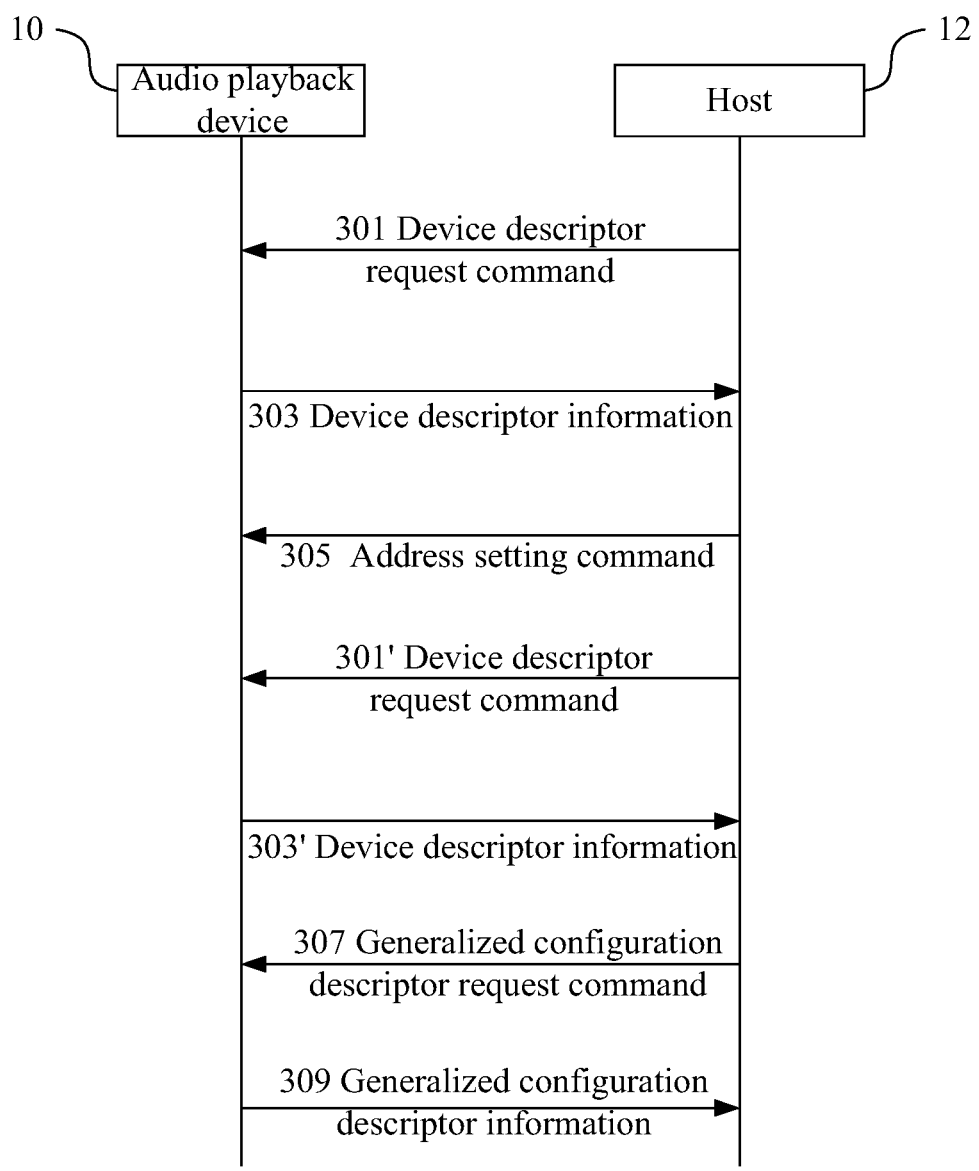
FIG. 3 is a diagram illustrating the communication process performed between the host and the audio playback device in an embodiment of the present invention.

Reference is now made to FIG. 3. FIG. 3 is a diagram illustrating the communication process performed between the host 12 and the audio playback device 10 in an embodiment of the present invention. In an embodiment, the communication process illustrated in FIG. 3 is used to implement step 202 in FIG. 2.

At first, the audio playback device 10 receiving a device descriptor request command 301 from the host 12. The audio playback device 10 transmits the device descriptor information 303 to the host 12. In an embodiment, the host 12 uses the address 0 to transmit the device descriptor request command 301 to the audio playback device 10, while the audio playback device 10 performs bus enumeration by transmitting the device descriptor information 303.

The audio playback device 10 receives an address setting command 305 from the host 12. In an embodiment, before the host 12 transmits the address setting command 305, the host 12 resets the audio playback device 10. Further, the host 12 transmits the address setting command 305 to assign a new address to the audio playback device 10 to replace the address 0.

The audio playback device 10 receives the device descriptor request command 301' again from the host 12 and transmits the device descriptor information 303; again to the host 12. In an embodiment, the host 12 transmits the device descriptor request command 301' according to the newly set address.

Further, the audio playback device 10 receives a generalized configuration descriptor request command 307 from the host 12 and transmits the generalized configuration descriptor information 309 to the host 12. In an embodiment, the generalized configuration descriptor information 309 includes information corresponding to the first transmission bus format. More specifically, the generalized configuration descriptor information 309 includes such as, but not limited to configuration descriptor information, interface association descriptor information, audio control interface header descriptor information, audio control clock source unit descriptor information, audio control input terminal descriptor information, audio control output terminal descriptor information, endpoint descriptor information, audio streaming interface descriptor information, audio streaming format descriptor information, audio data endpoint descriptor information or a combination thereof.

After the audio playback device 10 selects the first audio playback device information 101 to respond to the host 12 in response to the status descriptor request, in step 203, the audio playback device 10 determines whether an audio class-specific request command (not illustrated) is received from the host 12. In an embodiment, the audio class-specific request command is a command that forces the audio playback device 10 to execute a message or respond a message, e.g. volume and sample rate.

As a result, when the audio playback device 10 receives the audio class-specific request command from the host 12, the audio playback device 10 determines that the host 12 supports the first transmission bus format. As a result, in step 204, the audio playback device 10 maintains response to the status descriptor request from the host 12.

In an embodiment, the audio playback device 10 responds the host with audio class-specific request command information. In an embodiment, the audio class-specific request commands information includes a current status of a silent control function, a lowest volume of a volume control function, a highest volume of the volume control function, a step of volume adjustment of the volume control function or a combination thereof. Further, the audio playback device 10 performs audio data transmission with the host 12 to respond such as, but not limited to the audio playback request from the host 12.

When the audio playback device 10 does not receive the audio class-specific request command from the host 12, the audio playback device 10 determines that the host 12 does not support the first transmission bus format.

As a result, in step 205, the audio playback device 10 is electrically re-connected to the host 12 through the bus 14 again. In an embodiment, the audio playback device 10 electrically disconnects the bus 14 from the host 12 and electrically couples the bus 14 and the host 12 again. Furthermore, the audio playback device 10 selects the second audio playback device information 103 to respond to the host 14 such that when the audio class-specific request command is received from the host 12, the audio playback device 10 keeps responding the status descriptor request from the host 12.

In an embodiment, the second transmission bus format has weaker transmission ability than the first transmission bus format. For example, the second transmission bus format has a lower bandwidth than the first transmission bus format. In other embodiments, the second transmission bus format may have a lower transmission speed than the first transmission bus format.

In convention design, when the host 12 does not support the transmission bus formats that the audio playback device 10 supports, a compatibility issue occurs such that the audio playback device 10 can not operate with the host 12. By using the audio playback device 10 and the audio playback device operation method 200, the audio playback device 10 can detect whether the host 12 supports a specific transmission bus format and changes to other transmission bus formats to respond to the host 12 when the host 12 does not support the specific transmission bus format. The compatibility issue can thus be solved.

In the embodiments described above, two pieces of the audio playback device information corresponding to two transmission bus formats stored in the storage unit 100 are used as an example. In other embodiments, the storage units 100 can store more than two pieces of the audio playback device information corresponding to more than two transmission bus formats. Whether the host 12 supports each of the audio playback device information can be determined until one of the audio playback device information that the host 12 supports can be used to communicate with the host 12.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An audio playback device operation method used in an audio playback device comprising:
    electrically connecting the audio playback device to a host through a bus;
    selecting first audio playback device information corresponding to a first transmission bus format to respond to the host in response to a status descriptor request from the host;
    determining whether an audio class-specific request command is received from the host;
    when the audio class-specific request command is received from the host, maintaining response to the status descriptor request from the host;
    when the audio class-specific request command is not received, determining that the host does not support the first transmission bus format, electrically connecting the audio playback device to the host through the bus again and selecting second audio playback device information corresponding to a second audio bus transmission format to respond to the host according to the status descriptor request of the host such that when the audio class-specific request command is received, the response to the status descriptor request from the host is maintained.

2. The audio playback device operation method of claim 1, wherein the first audio playback device information and the second audio playback device information respectively comprise device descriptor information and generalized configuration descriptor information, and the step of selecting either the first audio playback device information or the second audio playback device information to respond to the host further comprises:
    receiving a device descriptor request command from the host;
    transmitting the device descriptor information to the host;
    receiving an address setting command from the host;
    receiving the device descriptor request command again from the host;
    transmitting the device descriptor information again to the host;
    receiving a generalized configuration descriptor request command from the host; and
    transmitting the generalized configuration descriptor information to the host.

3. The audio playback device operation method of claim 2, wherein when the first audio playback device information is selected to respond to the host, the generalized configuration descriptor information includes information corresponding to the first transmission bus format, and when the second audio playback device information is selected to respond to the host, the generalized configuration descriptor information includes information corresponding to the second transmission bus format.

4. The audio playback device operation method of claim 2, wherein the generalized configuration descriptor information comprises configuration descriptor information, interface association descriptor information, audio control interface header descriptor information, audio control clock source unit descriptor information, audio control input terminal descriptor information, audio control output terminal descriptor information, endpoint descriptor information, audio streaming interface descriptor information, audio streaming format descriptor information, audio data endpoint descriptor information or a combination thereof.

5. The audio playback device operation method of claim 1, wherein a bandwidth of the second transmission bus format is lower than the bandwidth of the first transmission bus format.

6. The audio playback device operation method of claim 1, wherein when the host receives the audio class-specific request command, the step of keeping responding the status descriptor request from the host further comprises:
    responding the host with audio class-specific request command information; and
    performing audio data transmission with the host.

7. The audio playback device operation method of claim 6, wherein the audio class-specific request command information comprises a current status of a silent control function, a lowest volume of a volume control function, a highest volume of the volume control function, a step of volume adjustment of the volume control function or a combination thereof.

8. The audio playback device operation method of claim 1, wherein the first transmission bus format is universal serial bus device class definition for audio devices v2.0, and the second transmission bus format is universal serial bus device class definition for audio devices v1.0.

9. The audio playback device operation method of claim 1, wherein when the audio class-specific request command is not received, the audio playback device operation method further comprises:
    electrically disconnecting the bus and the host and electrically re-connecting the bus and the host.

10. An audio playback device comprising:
a storage unit configured to store a plurality of pieces of audio playback device information corresponding to a plurality of transmission bus formats and an application program; and
a processing unit electrically connected to the storage unit and configured to retrieve the application program to execute an audio playback device operation method, wherein the audio playback device operation method comprises:
electrically connecting the audio playback device to a host through a bus;
selecting first audio playback device information corresponding to a first transmission bus format to respond to the host in response to a status descriptor request from the host;
determining whether an audio class-specific request command is received from the host;
when the audio class-specific request command is received from the host, maintaining response to the status descriptor request from the host;
when the audio class-specific request command is not received, determining that the host does not support the first transmission bus format, electrically connecting the audio playback device to the host through the bus again and selecting second audio playback device information corresponding to a second audio bus transmission format to respond to the host according to the status descriptor request of the host such that when the audio class-specific request command is received, the response to the status descriptor request from the host is maintained.

11. The audio playback device of claim 10, wherein the first audio playback device information and the second audio playback device information respectively comprise device descriptor information and generalized configuration descriptor information, and the step of selecting either the first audio playback device information or the second audio playback device information to respond to the host further comprises:
receiving a device descriptor request command from the host;
transmitting the device descriptor information to the host;
receiving an address setting command from the host;
receiving the device descriptor request command again from the host;
transmitting the device descriptor information again to the host;
receiving a generalized configuration descriptor request command from the host; and
transmitting the generalized configuration descriptor information to the host.

12. The audio playback device of claim 11, wherein when the first audio playback device information is selected to respond to the host, the generalized configuration descriptor information includes information corresponding to the first transmission bus format, and when the second audio playback device information is selected to respond to the host, the generalized configuration descriptor information includes information corresponding to the second transmission bus format.

13. The audio playback device of claim 11, wherein the generalized configuration descriptor information comprises configuration descriptor information, interface association descriptor information, audio control interface header descriptor information, audio control clock source unit descriptor information, audio control input terminal descriptor information, audio control output terminal descriptor information, endpoint descriptor information, audio streaming interface descriptor information, audio streaming format descriptor information, audio data endpoint descriptor information or a combination thereof.

14. The audio playback device of claim 10, wherein a bandwidth of the second transmission bus format is lower than the bandwidth of the first transmission bus format.

15. The audio playback device of claim 10, wherein when the host receives the audio class-specific request command, the step of keeping responding the status descriptor request from the host further comprises:
responding the host with audio class-specific request command information; and
performing audio data transmission with the host.

16. The audio playback device of claim 15, wherein the audio class-specific request command information comprises a current status of a silent control function, a lowest volume of a volume control function, a highest volume of the volume control function, a step of volume adjustment of the volume control function.

17. The audio playback device of claim 10, wherein the first transmission bus format is universal serial bus device class definition for audio devices v2.0, and the second transmission bus format is universal serial bus device class definition for audio devices v1.0.

18. The audio playback device of claim 10, wherein when the audio class-specific request command is not received, the audio playback device operation method further comprises:
electrically disconnecting the bus and the host and electrically re-connecting the bus and the host.

* * * * *